United States Patent [19]

Beraut

[11] 4,253,618
[45] Mar. 3, 1981

[54] FISHING REEL

[75] Inventor: Alain Beraut, Thyez, France

[73] Assignee: Mitchell S.A., France

[21] Appl. No.: 86,248

[22] Filed: Oct. 18, 1979

[30] Foreign Application Priority Data

Oct. 23, 1978 [FR] France .................. 78 30693

[51] Int. Cl.³ .................. A01K 89/00; G05G 1/00
[52] U.S. Cl. .................. 242/84.1 J; 74/547
[58] Field of Search .................. 242/84.1 J, 84.21 R, 242/84.21 G; 74/547, 548

[56]  References Cited

FOREIGN PATENT DOCUMENTS

| | | | |
|---|---|---|---|
| 310486 | 1/1919 | Fed. Rep. of Germany | 74/547 |
| 2752796 | 5/1979 | Fed. Rep. of Germany | 242/84.1 J |
| 957937 | 8/1949 | France | 242/84.21 R |
| 926656 | 5/1963 | United Kingdom | 242/84.1 J |

Primary Examiner—Billy S. Taylor

Attorney, Agent, or Firm—Robert E. Burns; Emmanuel J. Lobato; Bruce L. Adams

[57] ABSTRACT

A fishing reel consists of a crank which can be folded, when the reel is not in use for fishing. The crank consists of a hub which supports a lateral operating lever. The hub consists of two parts which are joined one on the other for relative pivoting around a shaft arranged perpendicularly to the hub and in a plane which contains the lever. These parts are held against relative pivoting by a sliding bolt which can be moved in directions along the lever. A spring tends to keep a profiled part of the bolt in engagement with a part of the combined profile provided in the part of the hub. A push rod, which forms part of the bolt, can be actuated in a direction in order to unlock the bolt, which makes it possible to fold the crank around the shaft. The reel can be used in all cases where it is desired that a fishing reel occupy as small as possible a volume when not in use for fishing.

6 Claims, 5 Drawing Figures

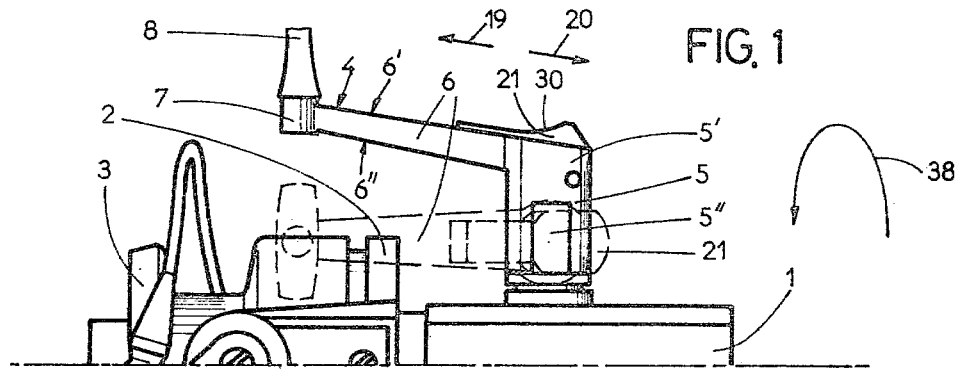
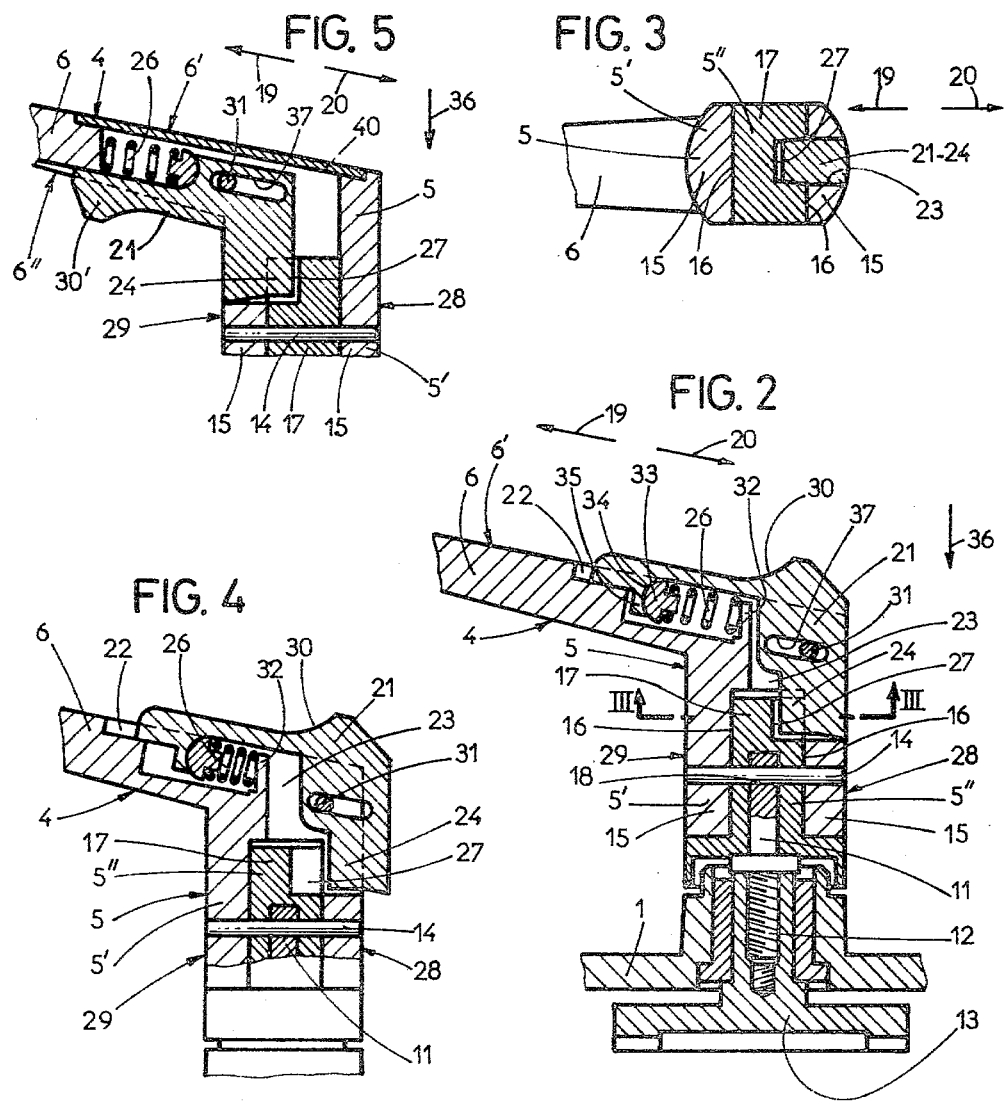

FISHING REEL

FIELD OF INVENTION

The present invention relates to fishing reels having a control crank which consists of a hub arranged in the extension of a control shaft and supporting a lever transverse to the hub. One part of the crank is able, after releasing a sliding resilient bolt, to pivot around an axis transverse to the hub and in a plane containing the lever, in order to reduce the space occupied by the crank when no fishing is taking place.

BACKGROUND OF THE INVENTION

In such reels, an example of which is disclosed in French Pat. No. 1 351 573, the axis arranged transversely to the hub and around which a part of the crank pivots, is combined with the axis of the lever. The pivoting part of the crank hence consists solely of the manoeuvring lever, and the space taken up by the hub remains unchanged when, while not in use for fishing, the crank is folded to reduce its size. Moreover, the bolt which holds the crank in the in-use position, during fishing, can be unlocked by a thrust in the direction of the hub and the control shaft. This bolt may thus be actuated inadvertently when the fishing reel, assembled on the fishing rod, accidentally strikes against the ground causing folding of the crank lever.

SUMMARY OF THE INVENTION

The fishing reel according to the invention obviates or mitigates these drawbacks. In the reel of the invention it is possible, when it is not in use for fishing, to fold the crank to reduce its size in a much greater proportion than previously, the unlocking of the bolt maintaining the crank in the in-use condition being easy to operate, without, however, there being risk, during fishing, of an inadvertent unlocking of the bolt, as a result of an accidental impact against the latter, all these advantages being obtained by a reel mechanism which is at least as simple as known reels.

According to the present invention there is provided a fishing reel comprising a control crank having a hub arranged in extension of a control shaft and supporting an operating lever 6 transverse of the hub, one part of the crank pivotal, after release of the sliding bolt, about an axis transverse to the hub and in a plane containing the operating lever to reduce the dimensions of the crank, the reel being characterised in that a first part of the hub, which supports the lever, is connected at the transverse axis to a second part of the hub arranged in extension of the control shaft, the two parts of the hub being, in the in-use position of the crank, secured against relative pivoting by the bolt which can be displaced relative to the lever and/or the first part of the hub in directions at least approximately parallel to the lever, and which includes a profiled part constantly resiliently urged into engagement with a complementary profiled part provided on the side of the second part of the hub, opposite to that which supports the lever, another part of the bolt in the form of a push part being arranged on the external side of the lever to enable a voluntary sliding of the bolt against the resilient action to disengage the profiled parts.

The complementary profiled part may be on the side of the second part of the hub, which supports the lever, and the other part of the bolt, in the form of a push rod, is arranged on the internal side of the lever.

REFERENCE TO DRAWING

Embodiments of the present invention will now be described, by way of example, with reference to the accompanying drawing, in which:

FIG. 1 is a partial sideview of a first embodiment of a fishing reel in accordance with the invention.

FIG. 2 is a fragmentary sectional view, to an enlarged scale, of the fishing reel of FIG. 1.

FIG. 3 is a sectional view on the line III—III of FIG. 2.

FIG. 4 is a partial view of FIG. 2 showing the fishing reel in use.

FIG. 5 is a partial cross sectional view similar to FIG. 2 of a second embodiment of the fishing reel.

DESCRIPTION OF PREFERRED EMBODIMENTS

Referring to FIG. 1, the fishing reel/consists of a housing 1 containing the mechanism for driving of a drum 2 and a reel 3. The driving mechanism is controlled by a crank 4 having a hub 5 supporting an operating lever 6 arranged transversely of the axis of the hub 5. The free end 7 of the lever 6 mounts a knob 8 which is gripped by a fisherman to operate the crank 4.

Referring now to FIGS. 2 to 4, the hub 5 includes a first part 5' which supports the lever 6, and a second part 5" which is an extension of a control shaft 11 with which it is integral. This control shaft 11 has an end part which has a left hand thread 12 engaging a corresponding female screw thread provided in a toothed control wheel 13 which forms the first element of the kinematic chain of the driving mechanism for rotating of the drum 2. The rest of this mechanism is not shown in the drawing. The first part 5' of the hub 5 includes, at its end opposite to that which suports the lever 6, two lugs 15 spaced from one another, the internal walls 16 of these two lugs 15 facing one another and being parallel to one another. The second part 5" of the hub 5 has at its end remote from the control shaft 11, an axial lug 17, whose width is just sufficient to penetrate with a slight play between the two walls 16. The two parts of the hub 5 are relatively pivotal around a shaft 14 whose ends are forcibly fitted into the two lugs 15 and whose middle part pivots freely in a hole 18 of the lug 17. This shaft 14 is arranged perpendicularly to the lugs 15 and 17, and in a plane which contains the manoeuvring lever 6.

It is possible to prevent relative pivoting of the two parts 5' and 5" of the hub by a bolt 21. In this example, this bolt 21 is slidable to-and-fro in a direction 19-20 parallel to the lever 6 in a longitudinal groove 22 in the outer side of the operating lever 6 and a groove 23 in the first part 5' in the hub 5 on the side opposite the operating lever. This bolt 21 consists of a bulbous push part 30 on the external side 6' of the lever 6, which serves to support a fisherman's thumb, and a profiled part 24 which is constantly urged in direction 19 by a helical compression spring 26 into a hollow profile or notch 27 provided in the second part 5" of the hub 5. This hollow profile 27, as well as the profiled part 24 which operates in conjunction with it, are arranged on the side 28 of the first part 5' of the hub 5, opposite to side 29, which supports the lever 26. The sliding bolt 21 is kept in place in groove 23 by a lateral shaft 31 whose ends are forcibly fitted on either side of the groove 23 in the first part 5' of the hub, and whose central part is fitted with a slight play in an axial elongate groove 27 in the bolt 21. The compression spring 26, which is housed under the bolt 21 inside the lever 6, is supported, at one end, on a fixed part 32 of the first part 5', and, at the other end, on a support element 33 of which one part 34, profiled in relief, engages with a hollow profiled part 35, of corresponding profile, provided in the bolt 21. This also tends to be held against the bottom of the guiding groove 22.

When fishing, the various elements occupy the position shown in FIGS. 1 to 3. The part 24 of the bolt 24 is pushed in direction 19 towards the free end of the lever 6 by the spring 26 in the hollow profiled part 27 of the second part 5" of the hub 5. The two parts 5' and 5" are hence kept in alignment. The crank 4 is thus un-folded into its in-use position. It is noted that, in this position, an accidental impact along directions 19 or 36 on the bolt 21 cannot cause any inadvertent unlocking of the said bolt 21.

When not in use for fishing, the crank 4 can be folded by pressing the bolt 21 in the direction 20 against the action of the spring 26, for example with the thumb on the push part 30 of the bolt 21. This causes the part 24 of this bolt to move out of the profiled hollow part 27, as shown in FIG. 4. The crank 4 is hence free to be pivoted in direction 38 around the shaft 14 and to occupy the position shown in broken lines, in FIG. 1. The crank is thus reduced in bulk owing to the fact that a large part of the hub, the lever 6 and the knob 8 are folded against the drum 2.

In the second embodiment (FIG. 5) the bolt 21 is on the under side of the lever 6 and the part 24 and the cooperating hollow part or notch 27 are arranged on the same side 29 of the first part 5' of the hub 5 as the operating lever. The spring 26 tends constantly to push in direction 20 the part 24 into the hollow part 27. The push part 30 is replaced by a push part 30' arranged on the internal side 6" of the manoeuvring lever 6. A cover 40 closes the side 6' of the lever 6. All the other elements are identical to those of the first embodiment (FIGS. 1 to 4).

The operation of this reel is similar to that of the first embodiment. In the in-use position of the crank 4 (FIG. 5), no impact exerted along directions 20 or 36 on the bolt 21 causes unlocking of the crank 4. On the other hand, pressure in the direction 19 on the push part 30' permits unlocking of the bolt 21 and folding of the crank, as shown previously in dotted lines, on FIG. 1.

The fishing reel, which is the ojbject of the invention, can be used in all cases where it is desired that a fishing rod should occupy as small a volume as possible when not in use for fishing.

What is claimed is:

1. In a fishing reel having a control shaft for operating the reel, a control crank comprising a hub having an inner portion integral with said control shaft and an outer portion pivotally connected with said inner portion, a laterally extending operating lever integral with said outer portion of said hub and a knob at an outer end of said lever, the axis of said pivotal connection of said outer hub portion with said inner hub portion being in a plane containing said lever and the axis of said hub to permit pivotal movement of said outer hub portion and said operating lever between an operating position in which said outer hub portion is axially aligned with said inner hub portion and a non-operating position in which said lever and outer hub portion are folded over laterally to reduce the overall dimensions of the reel, and means for releasably holding said outer hub portion and operating lever in operating position comprising a bolt on said outer hub portion and lever and detent means on said inner hub portion engageable by said bolt to secure said outer hub portion and operating lever in operating position, said bolt being movable between a locking position in which it engages said detent means and unlocking position in which it is disengaged from said detent means, means for resiliently urging said bolt to locking position and a push part on said bolt engageable for manually moving said bolt to unlocking position.

2. A fishing reel according to claim 1, in which said outer hub portion has two lugs spaced from one another and having parallel inner faces, and said under hub portion has an axial lug received with slight play between said lugs of said outer hub portion, said pivotal connections comprising a pivot pin extending through aligned holes in said lugs perpendicular to said inner faces of said lugs of said outer hub portions.

3. A fishing reel according to claim 2, in which said detent means comprises a notch in said axial lug of said inner hub portion and said bolt has a portion engageable in said notch to secure said outer hub portion and operating lever in operating position.

4. A fishing reel according to claim 3, in which said bolt is generally L-shaped with a first part on the outer side of said operating lever and a second part on the side of said outer hub portion opposite said operating lever.

5. A fishing reel according to claim 3, in which said bolt is generally L-shaped with a first part on the inner side of said operating lever and a second part on the same side of said outer hub portion as said operating lever.

6. A fishing reel according to claims 4 or 5, in which said bolt is slidable in a direction lengthwise of said operating lever.

* * * * *